United States Patent
Camenisch et al.

(10) Patent No.: US 11,032,068 B2
(45) Date of Patent: Jun. 8, 2021

(54) LEAKAGE-DETERRING ENCRYPTION FOR MESSAGE COMMUNICATION

(71) Applicant: International Business Machines Corporation, Armonk, NY (US)

(72) Inventors: Jan L. Camenisch, Thalwil (CH); Maria Dubovitskaya, Zurich (CH); Patrick Towa, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 16/022,899

(22) Filed: Jun. 29, 2018

(65) Prior Publication Data

US 2020/0007318 A1    Jan. 2, 2020

(51) Int. Cl.
*H04L 9/00* (2006.01)
*H04L 9/08* (2006.01)
(Continued)

(52) U.S. Cl.
CPC .............. *H04L 9/0819* (2013.01); *H04L 9/14* (2013.01); *H04L 9/30* (2013.01)

(58) Field of Classification Search
CPC ........................................................ H04L 9/14
See application file for complete search history.

(56) References Cited

U.S. PATENT DOCUMENTS

| | | | | |
|---|---|---|---|---|
| 5,483,598 A | * | 1/1996 | Kaufman | .............. H04L 9/0662 380/43 |
| 6,473,860 B1 | * | 10/2002 | Chan | ..................... H04H 20/38 705/51 |

(Continued)

OTHER PUBLICATIONS

Cui, H., "Preservation of Privacy in Public-Key Cryptography", A thesis submitted in fulfilment of the requirements for the award of the degree Doctor of Philosophy, University of Wollongong, Oct. 2015, 178 pages.

(Continued)

*Primary Examiner* — Josnel Jeudy
(74) *Attorney, Agent, or Firm* — Scully, Scott, Murphy & Presser, P.C.; Daniel P. Morris

(57) ABSTRACT

Communicating a message via a leakage-deterring encryption scheme. A sender computer stores a public key $pk_o$ of a recipient key-pair ($pk_o$, $sk_o$) of a message recipient, a commitment c, bound to the public key $pk_o$, to a secret s of the message recipient, and a public key $pk_t$ of a decryptor key-pair ($pk_t$, $sk_t$). A receiver computer stores a secret key $sk_o$ of the recipient key-pair ($pk_o$, $sk_o$), the commitment c and an opening o to the commitment. A decryptor computer stores a secret key $sk_t$ of the decryptor key-pair ($pk_t$, $sk_t$). The sender computer is adapted to encrypt a message m for the message recipient by generating ciphertexts. The sender computer sends the ciphertexts to the receiver computer. The receiver computer is adapted to send a ciphertext to the decryptor computer and provide a proof. The decryptor computer is adapted to verify the proof.

16 Claims, 4 Drawing Sheets

(51) Int. Cl.
 H04L 9/30 (2006.01)
 H04L 9/14 (2006.01)

(56) References Cited

U.S. PATENT DOCUMENTS

| | | | |
|---|---|---|---|
| 8,913,749 B2 | 12/2014 | Miyazawa | |
| 9,407,431 B2 | 8/2016 | Bellare et al. | |
| 2003/0145200 A1* | 7/2003 | Eden | H04L 9/3236 713/161 |
| 2012/0300936 A1* | 11/2012 | Green | H04L 9/3073 380/278 |
| 2014/0082361 A1* | 3/2014 | Camenisch | H04L 9/0847 713/168 |
| 2014/0281502 A1 | 9/2014 | Keung Chan et al. | |
| 2015/0256336 A1 | 9/2015 | Stiglic et al. | |

OTHER PUBLICATIONS

Kiayias, A., et al., "How to Keep a Secret: Leakage Deterring Public-Key Cryptosystems", 2013, https://eprint.iacr.org/2013/845.pdf, Accessed on Jun. 28, 2018, 32 pages.
Qin, B., et al., "Efficient Chosen-Ciphertext Secure Public-Key Encryption Scheme With High Leakage-Resilience", IET Information Security, Dec. 15, 2014, pp. 32-42, vol. 9, Issue 1, Abstract only, Accessed on Dec. 12, 2017.
Camenisch, J., et al., "Formal Treatment of Privacy-Enhancing Credential Systems", Full Version, SAC, 2015, https://eprint.iacr.org/2014/708.pdf, Accessed on Jun. 27, 2018, 71 pages.
Nakanishi, T., et al., "Revocable group signature schemes with constant costs for signing and verifying", PKC 2009, https://www.iacr.org/archive/pkc2009/54430468/54430468.pdf, Accessed on Jun. 27, 2018, 18 pages, vol. 5443 of LNCS.
Baldimtsi, F., "Accumulators with Applications to Anonymity-Preserving Revocation", EuroS&P 2017, https://eprint.iacr.org/2017/043.pdf, Accessed on Jun. 27, 2018, 37 pages.
Camenisch, J., et al., "An Efficient System for Non-transferable Anonymous Credentials with Optional Anonymity Revocation", Extended Version of what is to appear in Advances in Cryptology—Eurocrypt 2001, https://eprint.iacr.org/2001/019.pdf, Accessed on Jun. 27, 2018, 30 pages.
Abdalla, M., et al., "Identity-Based Traitor Tracing", Proceedings of the 10th International Conference on Theory and Practice of Public-Key Cryptogology (PKC) 2007, Apr. 16-20, 2017, Springer-Verlag, LNCS 4450, pp. 361-376.
Abe, M., "Structure-Preserving Signatures and Commitments to Group Elements", CRYPTO 2010, Aug. 2010, pp. 209-236, vol. 6223 of LNCS.
Barak, B., "How to Go Beyond the Black-box Simulation Barrier", Dec. 30, 2008, http://www.boazbarak.org/Papers/nonbb.pdf, Accessed on Jun. 27, 2018, 48 pages.
Boneh, D., et al., "An Efficient Public Key Traitor Tracing Scheme", CRYPTO'99, Extended Abstract, Aug. 1999, pp. 338-353, vol. 1666 of LNCS.
Bellare, M., et al., "On Defining Proofs of Knowledge", CRYPTO'92, Aug. 1993, pp. 390-420, vol. 740 of LNCS.
Backes, M., et al., "On the Necessity of Rewinding in Secure Multiparty Computation", https://www.iacr.org/archive/tcc2007/43920157/43920157.pdf, Accessed on Jun. 27, 2018, 17 pages.
Boneh, D., "Traitor Tracing with Constant Size Ciphertext", Aug. 15, 2008, https://eprint.iacr.org/2006/298.pdf, Accessed on Jun. 27, 2018, pp. 17 pages.
Bellare., M., et al., "Random Oracles are Practical: A Paradigm for Designing Efficient Protocols", First ACM Conference on Computer and Communications Security, ACM, Nov. 1993, Oct. 20, 1995, 20 pages.
Boneh, D., et al., "Fully Collusion Resistant Traitor Tracing with Short Ciphertexts and Private Keys", https://eprint.iacr.org/2006/045.pdf, May 16, 2006, 29 pages.

Boneh, D., et al., "A Fully Collusion Resistant Broadcast, Trace, and Revoke System", Aug. 30, 2006, https://eprint.iacr.org/2006/298.pdf, Accessed on Jun. 27, 2018, 30 pages.
Boneh, D., et al., "Multiparty Key Exchange, Efficient Traitor Tracing, and More from Indistinguishability Obfuscation", https://eprint.iacr.org/2013/642.pdf, Accessed on Jun. 27, 2018, 49 pages.
Chor, B., et al.,"Tracing traitors", Advances in Cryptology—CRYPTO'94, Aug. 1994, pp. 257-270, Springer, Heidelberg, vol. 839 of LNCS.
Camenisch, J., et al., "Formal Treatment of Privacy-Enhancing Credential Systems", Full Version, https://eprint.iacr.org/2014/708.pdf, Accessed on Jun. 27, 2018, 71 pages.
Chabanne, H., et al., "Public Traceability in Traitor Tracing Schemes", EUROCRYPT 2005, May 2005, pp. 542-558, Springer, Heidelberg, vol. 3494 of LNCS.
Cramer, R., et al., "A Practical Public Key Cryptosystem Provably Secure Against Adaptive Chosen Ciphertext Attack", https://link.springer.com/content/pdf/10.1007%2FBFb0055717.pdf, Accessed on Jun. 27, 2018, pp. 14-25.
Camenisch, J., et al., "Practical Verifiable Encryption and Decryption of Discrete Logarithms", CRYPTO 2003, Aug. 2003, pp. 126-144, Springer, Heidelberg, vol. 2729 of LNCS.
Dwork, C., et al., Digital Signets: Self-Enforcing Protection of Digital Information (Preliminary Version), http://citeseerx.ist.psu.edu/viewdoc/download?doi=10.1.1.48.1439&rep=rep1&type=pdf, Accessed on Jun. 27, 2018, 10 pages.
Elgamal, T., "A Public Key Cryptosystem and a Signature Scheme Based on Discrete Logarithms", Advances in Cryptology—CRYPTO'84, Aug. 1984, pp. 10-18, Springer, Heidelberg, vol. 196 of LNCS.
Fiat, A., et al., "How to Prove Yourself: Practical Solutions to Identification and Signature Problems", Advances in Cryptology—CRYPTO'86, Aug. 1987, pp. 186-194, Springer, Heidelberg, vol. 263 of LNCS.
Goldwasser, S., et al., "The Knowledge Complexity of Interactive Proof-Systems", (Extended abstract), ACM, 1985, https://groups.csail.mit.edu/cis/pubs/shafi/1985-stoc.pdf, Accessed on Jun. 27, 2018, pp. 291-304.
Kurosawa, K., et al., "Optimum Traitor Tracing and Asymmetric Schemes", https://link.springer.com/content/pdf/10.1007%2FBFb0054123.pdf, Accessed on Jun. 27, 2018, pp. 145-157.
Kiltz, E., "Chosen-Ciphertext Security from Tag-Based Encryption", https://www.iacr.org/archive/tcc2006/38760585/38760585.pdf, Accessed on Jun. 27, 2018, 20 pages.
Kiayias, A., et al., "Traitor Deterring Schemes: Using Bitcoin as Collateral for Digital Content", CCS '15, Oct. 12-16, 2015, pp. 231-242.
Kiayias, A., et al., "Traitor Tracing with Constant Transmission Rate", EUROCRYPT 2002, Apr./May 2002, pp. 450-465, Springer, Heidelberg, vol. 2332 of LNCS.
Lim, C.H., et al., "Another Method for Attaining Security Against Adaptively Chosen Ciphertext Attacks", Advances in Cryptology—CRYPTO'93, Aug. 1994, pp. 420-434, Springer, Heidelberg, vol. 773 of LNCS.
Liu, Z., et al., "Traceable CP-ABE on Prime Order Groups: Fully Secure and Fully Collusion-resistant Blackbox Traceable", https://eprint.iacr.org/2015/850.pdf, Accessed on Jun. 28, 2018, 37 pages.
Nishimaki, R., et al., "Anonymous Traitor Tracing: How to Embed Arbitrary Information in a Key", https://eprint.iacr.org/2015/750.pdf, Accessed on Jun. 27, 2018, 41 pages.
Pederson, T.P., et al., "Non-Interactive and Information-Theoretic Secure Verifiable Secret Sharing", Advances in Cryptology—CRYPTO'91, Aug. 1992, pp. 129-140, Springer, Heidelberg, vol. 576 of LNCS.
Rogaway, P., et al., "A Provable-Security Treatment of the Key-Wrap Problem", https://pdfs.semanticscholar.org/1fa0/20b3a5536d59d9e78395581e5fb76e8bb479.pdf, Accessed Jun. 27, 2018, 18 pages.
Shoup, V., et al., "Securing Threshold Cryptosystems against Chosen Ciphertext Attack", A preliminary version of this paper appears in the Proceedings of EuroCrypt'98, Nov. 22, 1999, 14 pages.

* cited by examiner

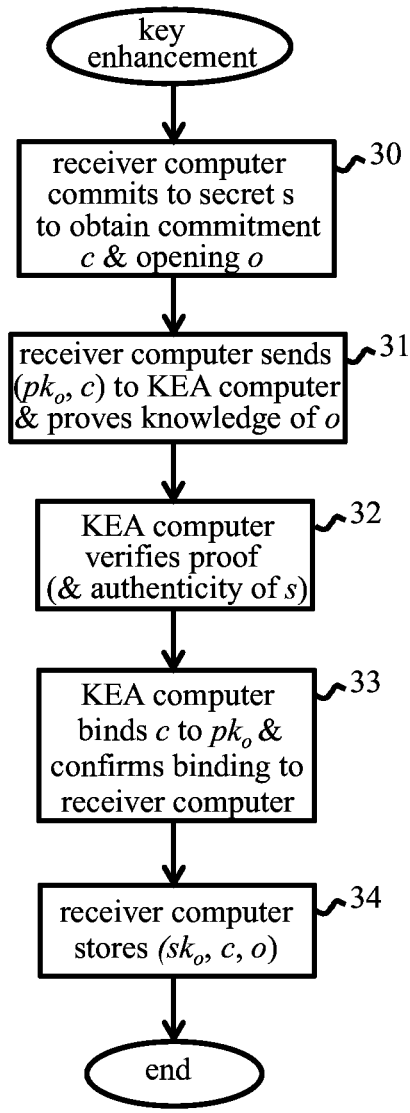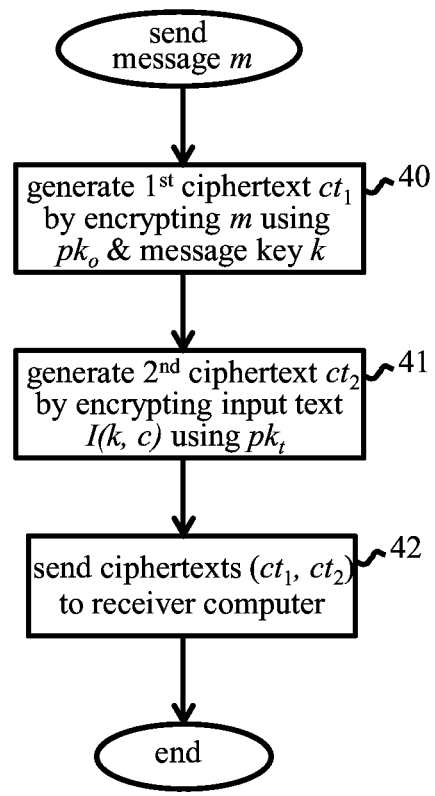
Figure 3
Figure 4

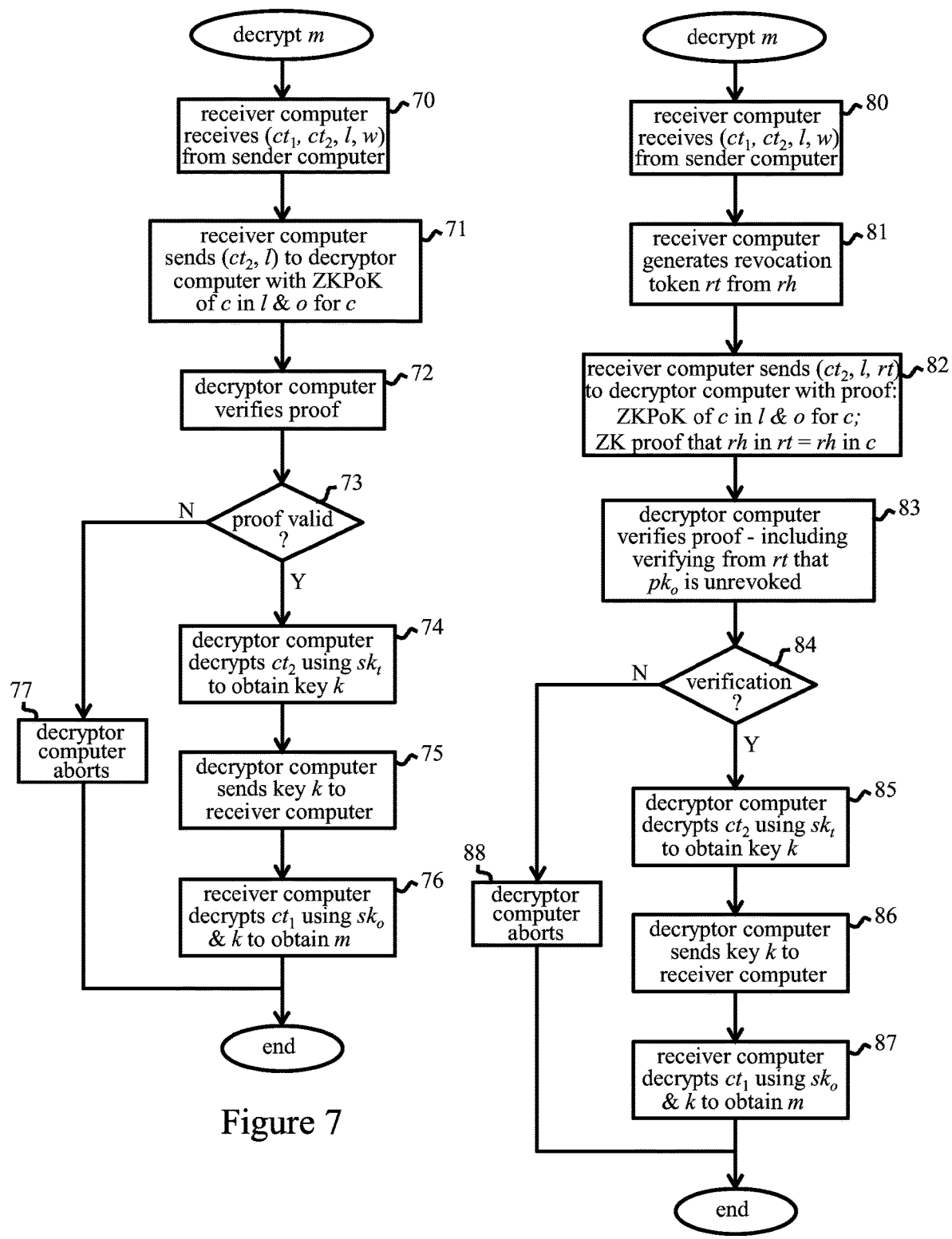

LEAKAGE-DETERRING ENCRYPTION FOR MESSAGE COMMUNICATION

BACKGROUND

The present disclosure relates generally to leakage-deterring encryption, and more particularly to communication of messages between sender and receiver computers using leakage-deterring encryption to protect the message data.

Secure communication between sender and receiver computers over potentially insecure networks can be achieved using a standard PKI (public key infrastructure) for message encryption/decryption. A message recipient has a cryptographic key-pair (pk, sk) where sk is the recipient's private key, which is secret to that recipient, and pk is the corresponding public key. To send a message to the recipient, a sender computer uses the recipient's public key pk to encrypt the message data m. The receiver computer then uses the recipient's secret key sk to decrypt the encrypted message, whereby possession of the correct secret key sk is required for successful decryption. Public keys are authenticated via certificates issued by a certification authority, whereby senders can verify that a given public key belongs to the intended recipient of a message.

A problem with standard public-key encryption is that security relies on secrecy of users' secret keys sk. It is difficult in practice to prevent users from sharing their secret keys. Users might want to share their keys or cryptographic capabilities out of convenience, to let other parties act on their behalf, e.g. to allow them to decrypt certain ciphertexts generated at a specific time, or from a particular sender. This could be achieved, for instance, using an obfuscated program implementing a decryption algorithm employing the secret key. In other scenarios, users might share their capabilities out of malice, e.g. to share access to paid resources, grant access to company secrets, etc. One way to inhibit such behavior is to use tamperproof hardware, but this is expensive and difficult to build, deploy, and manage. Leakage-deterring encryption schemes offer a solution to this problem.

In leakage-deterring encryption schemes, each user (e.g., each message recipient owning a key-pair (pk, sk)), provides some data s which the user may prefer to keep secret. This secret data s is then embedded in, i.e. bound (cryptographically) to, that user's public key in such a way that the secret s will be revealed to any party with whom the user shares the capability to decrypt messages. More precisely, if a user makes available a (possibly obfuscated) program that allows decryption, then that program can be used to retrieve the secret s from the public key. The data s can be any information which the user prefers to keep secret, e.g. credit card details, bank account access data, or other personal data of value to the user. The desire to protect this secret data inherently provides a deterrent against leakage of secret keys/decryption algorithms by users.

Leakage-deterring encryption schemes are discussed in: "How to keep a secret: leakage deterring public-key cryptosystems", Kiayias and Tang, ACM CCS 13, pages 943-954, ACM Press, November 2013; and "Traitor deterring schemes: Using bitcoin as collateral for digital content", Kiayias and Tang, ACM CCS 15, pages 231-242. ACM Press, October 2015. In these schemes, a user is required to disclose her secret s to the authority which embeds the secret in her public key. The authority is therefore trusted with users' secrets, which is an unreasonably strong trust assumption. Another problem with these schemes is efficiency. For example, in the generic construction of an IND-CPA/CCA-secure (secure under chosen plaintext attack/chosen ciphertext attack) encryption scheme, the size of the keys and the ciphertext size grow linearly with the size of the secret information s.

Improvements in leakage-deterring encryption schemes would be highly desirable.

SUMMARY

According to at least one embodiment of the present invention there is provided a system for communicating a message, the system comprising a sender computer, a receiver computer and a decryptor computer each operable for communication via a network. The sender computer stores a public key $pk_o$ of a recipient key-pair ($pk_o$, $sk_o$) of a message recipient, a commitment c, bound to the public key $pk_o$, to a secret s of the message recipient, and a public key $pk_t$ of a decryptor key-pair ($pk_t$, $sk_t$). The receiver computer stores a secret key $sk_o$ of the recipient key-pair ($pk_o$, $sk_o$), the commitment c and an opening o to the commitment. The decryptor computer stores a secret key $sk_t$ of the decryptor key-pair ($pk_t$, $sk_t$). The sender computer is adapted to encrypt a message m for the message recipient by generating first and second ciphertexts. The first ciphertext encrypts the message m using a randomly-generated message key k and the public key $pk_o$ of the recipient key-pair. The second ciphertext encrypts an input, comprising the message key k and the commitment c, using a public key $pk_t$ of the decryptor key-pair ($pk_t$, $sk_t$). The sender computer sends the first and second ciphertexts to the receiver computer via the network. The receiver computer is adapted, in response to receipt of the first and second ciphertexts, to send the second ciphertext to the decryptor computer via the network and provide to the decryptor computer a proof proving knowledge of the commitment c in the second ciphertext and of the opening o to the commitment. The decryptor computer is adapted to verify the proof and, if the proof is verified, to send the message key k, obtained by decrypting the second ciphertext using the secret key $sk_t$ of the decryptor key-pair, to the receiver computer via the network. The receiver computer is further adapted, in response to receipt of the message key k, to decrypt the first ciphertext, using the message key k and the secret key $sk_o$ of the recipient key-pair, to obtain the message m.

In systems embodying the invention in an embodiment, the secret s of the message recipient is embedded in the recipient's public key $pk_o$ via a commitment to the secret which is bound to the key $pk_o$. (The concept of commitment is well-known in cryptography and described in more detail below). Decryption of a message m sent by the sender computer to the receiver computer requires interaction with the decryptor computer to obtain the message key k. In particular, the sender computer must prove knowledge of the commitment c (in the second ciphertext) and of an opening o to this commitment. This is equivalent to proving knowledge of the secret s. The requirement for this proof of knowledge in turn ensures that any party who can successfully decrypt a message m intended for a particular message recipient can also recover the message recipient's secret s. The system thus implements a leakage-deterring encryption scheme. However, since the secret s is bound to a user's public key via a commitment, users' secrets need not be disclosed to an authority performing the binding. Trust in the authority is not required, and privacy of honest users' secrets is preserved. Moreover, leakage-deterring encryption schemes embodying the invention in an embodiment can be implemented very efficiently, while providing high security and full privacy for users. These and other advantages are discussed in more detail below.

In embodiments, the proof provided by the receiver computer comprises a zero-knowledge proof of knowledge of the commitment c and opening o. With a zero-knowledge proof, the verifier learns only what is necessary to be proved, and nothing more. The decryptor computer is thereby rendered oblivious. As discussed further below, the proof provided by the receiver computer may in general comprise one or more component proofs, and may prove additional facts to be verified at the decryptor computer before release of the message key k.

The sender computer in an embodiment is adapted to re-randomize the commitment c to produce a re-randomized commitment value, and to generate the second ciphertext from an input comprising the message key k and the re-randomized commitment value. This offers unlinkability in communications with the decryptor computer, whereby the decryptor computer cannot link different communications relating to ciphertexts for the same message recipient. Embodiments achieve this efficiently using an encryption scheme with labels for producing the second ciphertext. In particular, the sender computer is adapted to produce the re-randomized commitment value using a randomly-generated value w, and to generate the second ciphertext via such a label encryption scheme, where the input for the second ciphertext comprises the message key k and a label comprising the re-randomized commitment value. The sender computer sends the label and the randomly-generated value w to the receiver computer with the first and second ciphertexts. The receiver computer then sends the label to the decryptor computer with the second ciphertext.

In embodiments, the sender computer is adapted to generate the first ciphertext by: generating the message key k as a one-time pad key; performing one-time pad encryption of the message m, using the message key k, to produce an encrypted message m'; and then encrypting the encrypted message m' using the public key $pk_o$ of the recipient key-pair. This provides a simple and secure scheme for highly efficient implementations.

Some embodiments can exploit the use of a decryptor computer to enforce revocation of public keys. It is common practice for public keys to be associated with a revocation status, which is publicly available, which indicates whether a given key has been revoked (and is therefore invalid) or is unrevoked (still valid). A public key may be revoked, for example, if a message recipient's secret key is lost or stolen. If the decryptor computer checks the revocation status of a recipient's public key before releasing a message key k, then decryption of ciphertexts for revoked keys can be prevented. Particularly advantageous embodiments allow this feature to be implemented by an oblivious decryptor computer while preserving anonymity of message recipients. In these embodiments, the commitment c comprises a commitment to both the secret s and a revocation handle rh which is associated with a public revocation status for the public key pk, of the recipient key-pair. This revocation handle rh is stored by the receiver computer. The receiver computer is further adapted to generate from the revocation handle rh a revocation token rt, permitting verification of the revocation status associated with the revocation handle rh, and to send the revocation token rt to the decryptor computer with the second ciphertext. The proof provided by the receiver computer further proves that the revocation token rt was generated from the revocation handle rh in the commitment c in the second ciphertext. The decryptor computer is adapted, in verifying the proof, to verify from said revocation status that the public key $pk_o$ is unrevoked.

At least one further embodiment of the invention provides a computer-implemented method for sending a message performed by a sender computer of the above system. At least one additional embodiment of the invention provides a computer-implemented method, performed by a receiver computer of the above system, for decrypting a message sent from a sender computer of the system.

In general, where features are described herein with reference to a message communication system embodying the invention, corresponding features may be provided in sending/decryption methods embodying the invention, and vice versa.

Embodiments of the invention will be described in more detail below, by way of illustrative and non-limiting example, with reference to the accompanying drawings.

BRIEF DESCRIPTION OF THE SEVERAL VIEWS OF THE DRAWINGS

FIG. 3 indicates steps of a setup procedure performed in the FIG. 1 system in an embodiment;

FIG. 4 indicates steps of a method for sending a message performed by a sender computer of the system in an embodiment;

FIG. 7 indicates steps of a decryption method in an embodiment; and

FIG. 8 indicates steps of a decryption method in an embodiment accommodating revocation of public keys.

DETAILED DESCRIPTION

Figure 1:
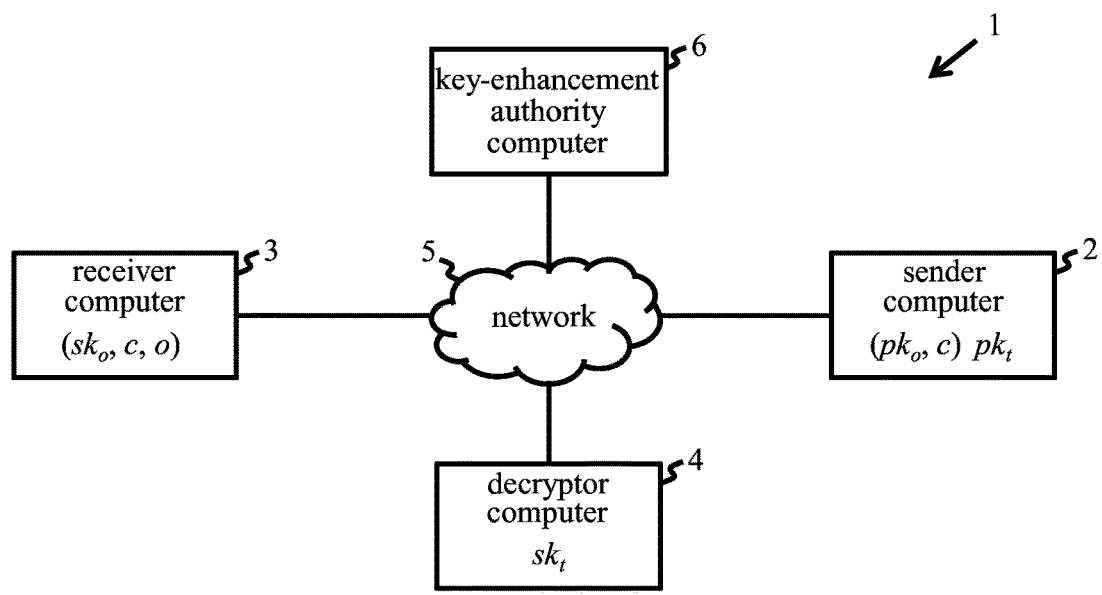
FIG. 1 is a schematic representation of a message communication system embodying the invention in an embodiment.

FIG. 1 shows an example system embodying the invention in an embodiment for communication of messages using a leakage-deterring encryption (LDE) scheme. The system 1 comprises a sender computer 2, a receiver computer 3 and a decryptor computer 4 each operable for communication via a network 5. To send a message to a message recipient, the sender computer 2 encrypts the message via an encryption algorithm of an LDE scheme detailed below. The sender computer sends the encrypted message via network 5 to receiver computer 3 for access by the message recipient. Decryption of the message is performed by interaction of receiver computer 3 and decryptor computer 4. The decryptor computer 4 is implemented as a third-party computer which is independent of both sender computer 2 and receiver computer 3. In the example shown, system 1 also includes a further, key-enhancement authority (KEA) computer 6. Receiver computer 3 can communicate with KEA computer 6 via network 5 in a setup procedure for recipient key-pairs detailed below. KEA computer 6 is shown separately in FIG. 1 for simplicity. As discussed further below, however, functionality of KEA computer 6 can be implemented by decryptor computer 4 in embodiments.

In practice, system 1 may include multiple sender and receiver computers for communication of messages to multiple message recipients. However, system operation can be fully understood from the description below relating to operation of sender computer 2 and receiver computer 3.

The network 5 may in general comprise one or more component networks and/or internetworks, including the Internet. Sender computer 2 and receiver computer 3 may typically comprise a general-purpose user computer such as a desktop computer, laptop computer, tablet, notebook, palmtop, mobile phone, PDA (personal digital assistant), or other computer device used for sending/receiving messages. Decryptor computer 4 and (where implemented separately) KEA computer 6 may be implemented, for example, by a server providing the functionality detailed below for multiple system users. In general, however, a computer 2, 3, 4 or 6 of system 1 may be implemented by a general- or special-purpose computer, which may comprise one or more (real or virtual) machines, providing functionality for implementing the operations described herein. This functionality may be provided by logic implemented in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
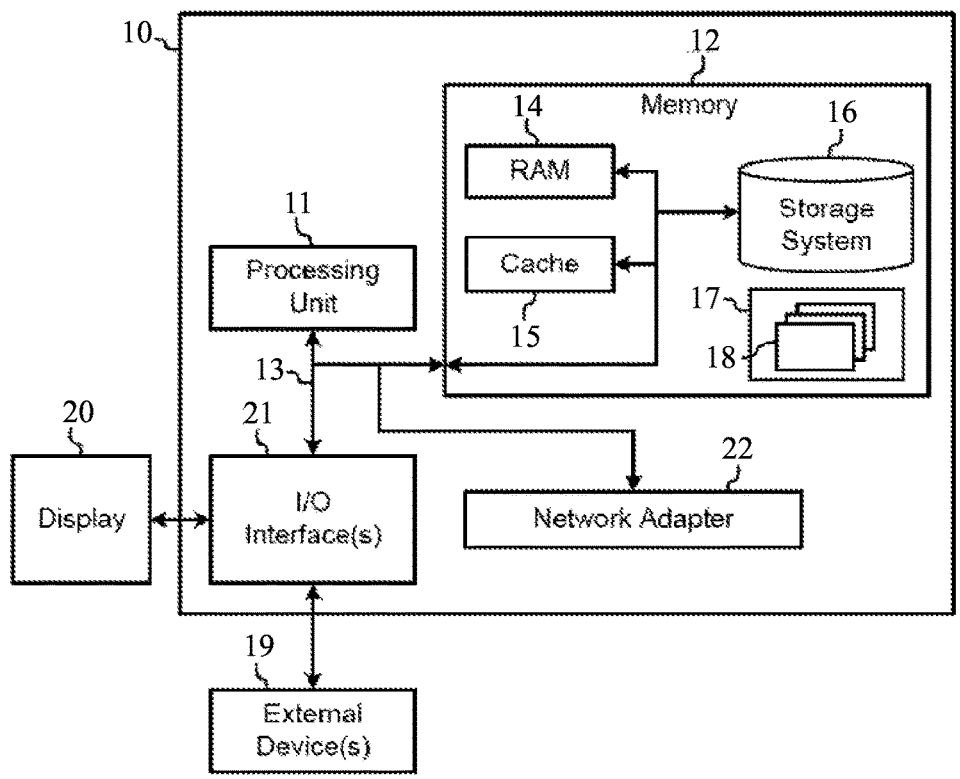
FIG. 2 is a generalized schematic of a computer in the FIG. 1 system in an embodiment.

The block diagram of FIG. 2 shows an example computing apparatus for implementing a computer of system 1 in an embodiment. The apparatus is shown here in the form of a general-purpose computing device 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

To receive messages via system 1, a user (message recipient) obtains a public-private key pair, denoted by ($pk_o$, $sk_o$), referred to below as a recipient key-pair. $sk_o$ is the recipient's secret (private) key, which is secret to that recipient, and pk, is the corresponding public key. This key pair can be generated in known manner via a standard PKI, and the public key $pk_o$ can be certified in the usual way. The recipient key pair ($pk_o$, $sk_o$) is then "enhanced" via a setup procedure performed by interaction with KEA computer 6. For this procedure, the user must possess some secret data s which is valuable to the user in the sense that she would not wish it to be disclosed. Numerous possibilities can be envisaged for such secret data. For example, the secret s may comprise access data for a bank account or for a payment system (e.g. a credit card or online payment mechanism), private personal data such as a social security number, or a secret underlying a cryptographic credential or other certificate (for example for a passport, driving license or other identity mechanism such as an ID card) which allows the user to prove personal information and/or access a facility or other resource. As a particular example, the secret s may comprise a secret key of a bitcoin account into which the user is required to make a deposit. Various other examples can be envisaged here, however, and in general the secret s may comprise any data which is deemed of sufficient value to the user that disclosure of the secret serves as a deterrent. Authenticity of a user secret can be assured in a variety of ways using well known cryptographic techniques. For example, information can be certified in various ways by some trusted authority, and the resulting certificates can be verified as genuine to confirm authenticity of the information. A secret underlying a credential, for instance, is authenticated by the (trusted) credential issuing authority. Known cryptographic techniques, e.g. based on zero-knowledge proof protocols, can be used to allow authentication of secret information embedded in a credential, certificate, etc., by an authority. For example, anonymous credential systems are well known in the art, and allow authentication of secret information in a credential without disclosure of the secret. Any such technique can be used here for verifying authenticity of user secrets, and the particular technique employed is orthogonal to operation of the LDE system described.

Basic steps of the key-enhancement procedure are indicated in FIG. 3 (where it is assumed here for simplicity that the user interacts with KEA computer 6 via receiver computer 3). In step 30, the receiver computer (which is provided with the user's recipient key-pair ($pk_o$, $sk_o$) and secret s) commits to the secret s via a cryptographic commitment scheme. Commitment schemes, described in detail below, output a commitment c to an input secret s, and an opening o. The opening o comprises a randomly-generated value which is used to hide the secret s in the commitment c. The resulting commitment c is thus a randomized value which hides the secret s, and the opening o allows recovery of the secret s. In step 31, the receiver computer sends the public key $pk_o$ and the commitment c to the KEA computer 6, and provides to the KEA computer a cryptographic proof proving knowledge of the opening o for the commitment c, thereby proving knowledge of the secret s. (In this step, the receiver computer can also provide any credential/certificate, etc., as discussed above for authenticating the secret s in the commitment, together with any associated proof required by the authentication scheme to allow the KEA computer to verify that the credential/certificate is genuine and relates to the secret s in the commitment c. Details of this procedure will depend on the particular authentication system employed and are orthogonal to the key-enhancement operation described). In step 32, the KEA computer verifies the proof for the commitment c sent by the receiver computer (including verifying authenticity of the underlying secret s). Assuming the proof is valid, the KEA computer then binds the commitment c to the recipient's public key $pk_o$ in step 33. This binding can be achieved using any desired technique which permits a third party to verify that a public key $pk_o$ is bound to a particular commitment c. For example, standard cryptographic signature or certificate schemes can be used. In this example, the KEA computer generates a cryptographic signature σ on $pk_o$ and c using a secret key $sk_{KEA}$ of a key pair ($sk_{KEA}$, $pk_{KEA}$), i.e. σ=Sig ($sk_{KEA}$, $pk_o$, c) where Sig is a signing algorithm of a cryptographic signature scheme. The resulting signature can then be verified in known manner, via a verification algorithm of the signature scheme, using the public key $pk_{KEA}$. The commitment c is thus cryptographically bound to the key $pk_o$ via the signature σ. In other embodiments, $pk_o$ and c may be bound by embedding these values in a certificate or other credential which can be similarly verified using a public verification key. As another example, the KEA computer could simply publish a "binding table", e.g. on a webpage accessible via network 5, listing the public key $pk_o$ and the associated commitment c to which it is bound. Whatever binding mechanism is employed, the KEA computer then confirms the binding to receiver computer 3, in this case by returning the signature σ. In step 34 here, the receiver computer stores ($sk_o$, c, o) in preparation for receipt of messages sent to the user as detailed below. The values ($sk_o$, c, o) can thus be viewed as an enhanced secret key of the message recipient. The values ($pk_o$, c) can be viewed as the enhanced public key in which the commitment c is appended to $pk_o$. This enhanced public key is provided to parties wishing to communicate with the message recipient, together with any data (in this example the signature σ) required for verification of the binding. It is assumed implicitly in the following that any party using an enhanced public key ($pk_o$, c) has verified the binding of $pk_o$ and c in the manner provided by the binding mechanism.

For message communication in system 1, the decryptor computer has a decryptor key-pair ($pk_t$, $sk_t$) which can be generated in known manner via a standard PM. The secret key $sk_t$ is stored by decryptor computer 4, and the public key $pk_t$ is provided to all senders in the system. The receiver computer 3 stores a message recipient's enhanced secret key, comprising the secret key $sk_o$, the commitment c and the opening o to the commitment as described above. The sender computer 2 stores the message recipient's enhanced public key, comprising the public key $pk_o$ of the recipient key-pair ($pk_o$, $sk_o$) and the commitment c bound to that public key $pk_o$. Sender computer 2 also stores the public key $pk_t$ of the decryptor key-pair ($pk_t$, $sk_t$).

FIG. 4 indicates basic steps of a method performed by sender computer 2 for sending a message m to a message recipient via receiver computer 3 in an embodiment. The sender computer encrypts the message m by generating first and second ciphertexts. In step 40 of FIG. 4, the sender computer generates the first ciphertext $ct_1$ by encrypting the message m using a randomly-generated message key k and the public key $pk_o$ of the recipient key-pair. In step 41, the sender computer generates the second ciphertext $ct_2$ by encrypting an input text, denoted here by I(k, c) and comprising the message key k and the commitment c bound to $pk_o$, using the public key $pk_t$ of the decryptor key-pair. In step 42, the sender computer sends the ciphertexts $ct_1$, $ct_2$ to the receiver computer via network 5, and the sending process is complete.

Figure 5:
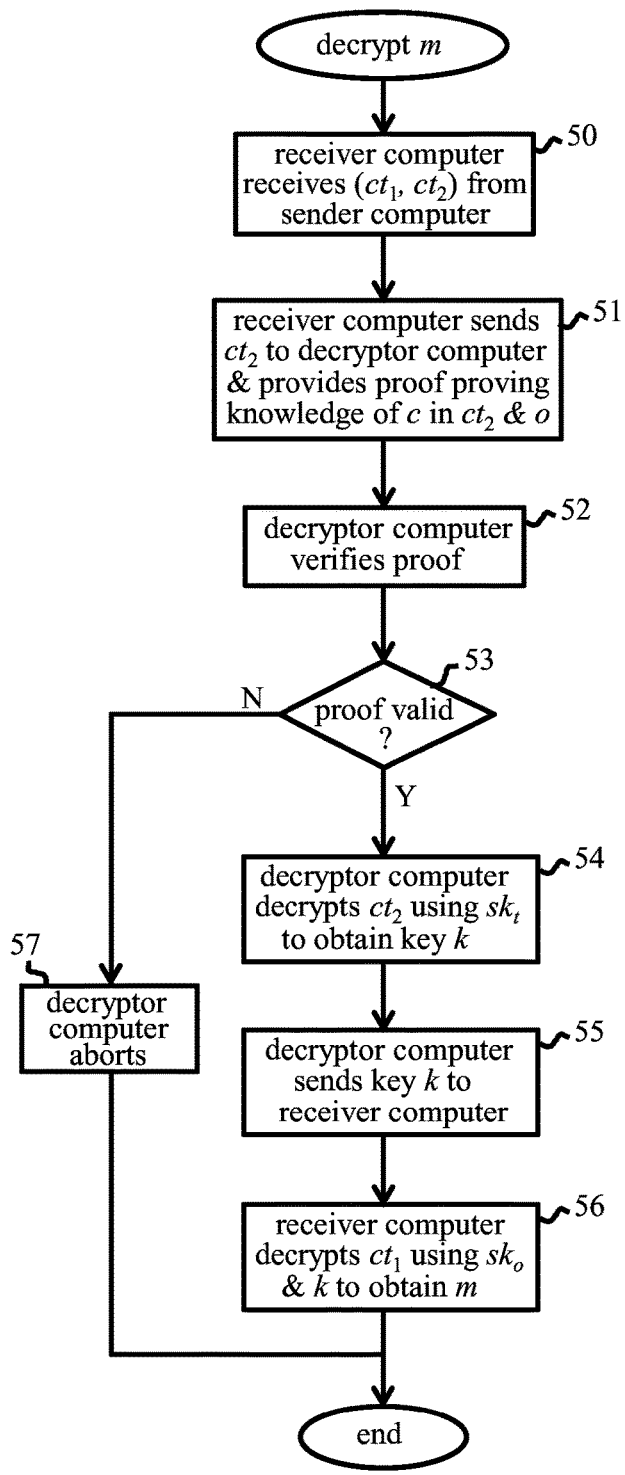
FIG. 5 indicates steps of a method for decrypting a message sent by the FIG. 4 method in an embodiment.

FIG. 5 indicates basic steps of the ensuing method for decrypting the message m from the encrypted message received by receiver computer 3 in an embodiment. In response to receipt of the ciphertexts $ct_1$, $ct_2$ in step 50, the receiver computer sends the second ciphertext $ct_2$ to decryptor computer 4 in step 51. The receiver computer also provides to the decryptor computer a cryptographic proof which proves knowledge, by the receiver computer, of the commitment c in the ciphertext $ct_2$ and of the opening o to this commitment. The decryptor computer verifies this proof for the ciphertext $ct_2$ in step 52. If the proof is verified, as indicated by a "Yes" (Y) at decision block 53, then operation proceeds to step 54. In this step, decryptor computer 4 decrypts the ciphertext $ct_2$, using the secret key $sk_t$ of its decryptor key-pair, to obtain the message key k. In step 55, the decryptor computer then sends the message key k to the receiver computer via network 5. In step 56, the receiver computer receives the message key k and then decrypts the first ciphertext $ct_1$ using the message key k and the secret key $sk_o$ of the recipient key-pair, thereby obtaining the original message m. If the proof made by receiver computer 3 in step 51 is not valid (decision "No" (N) at block 53), then the decryptor computer aborts the decryption operation and the process terminates. In this event, the message key k will not be sent to the receiver computer which is then unable to decrypt the ciphertext $ct_1$.

It can be seen that the receiver computer only receives the message key k required for message decryption if it can make a valid proof of knowledge of the commitment c in ciphertext $ct_2$, and of the opening o to this commitment, to decryptor computer 4. This is equivalent to proving knowledge of the user's secret s, whereby successful decryption requires proof of knowledge of the secret s. It follows from the requirement for this proof in the decryption process (in particular from the soundness property inherent to proofs of knowledge as detailed below) that any party in possession of a decryption algorithm capable of decrypting a message to the user can also use the decryption algorithm to recover the user's secret s. Hence, a user cannot share her decryption capabilities without exposing her secret s. This provides the premise for the leakage-deterring encryption scheme. Moreover, the scheme does not require the user to reveal her secret to the KEA authority since the secret s is hidden in a commitment bound her key $pk_o$. Full privacy of honest users' secrets is therefore preserved.

An embodiment of the LDE system will now be described with reference to FIGS. 6 and 7.

Figure 6:
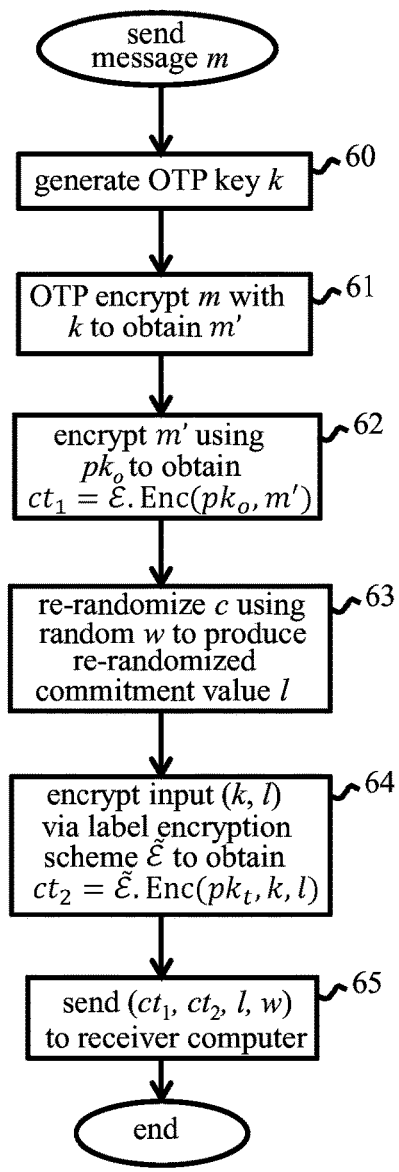
FIG. 6 indicates steps of a method for sending a message in an embodiment of the system.

FIG. 6 indicates operation of sender computer 2 in this embodiment. In step 60, the sender computer generates the message key k as a one-time pad (OTP) key. This comprises a random string of length corresponding to the length of the message m. In step 61, the sender computer uses the key k to perform one-time pad encryption of the message m to produce an encrypted message m'=m⊕k, where ⊕ denotes modular addition. In step 62, the sender computer generates the first ciphertext $ct_1$ by encrypting the encrypted message m', via an encryption algorithm Enc of a standard encryption scheme ε, using the recipient's public key $pk_o$, i.e. $ct_1$=ε.Enc($pk_o$, m'). In step 63, the sender computer re-randomizes the commitment c, using a randomly-generated value w, to produce a re-randomized commitment value l in which the commitment c is hidden. In step 64, the sender computer then generates the second ciphertext $ct_2$ via a label encryption scheme ε̄ using the re-randomized commitment value l as the label. (Label encryption schemes are described in detail below and essentially bind a ciphertext to a label in a non-malleable manner). The second ciphertext is generated by encrypting an input I=k, l using the public key $pk_r$ of the decryptor key-pair, as: $ct_2$=ε̄.Enc($pk_r$, k, l). In step 65, sender computer 2 sends ($ct_1$, $ct_2$, l, w) to receiver computer 3, and the operation is complete.

FIG. 7 indicates steps of the decryption method in this embodiment. On receipt of the encrypted message ($ct_1$, $ct_2$, l, w) in step 70, the receiver computer sends the second ciphertext $ct_2$, and the label l, to the decryptor computer 4 in step 71. In this embodiment, the receiver computer provides a zero-knowledge proof of knowledge (ZKPoK) of the commitment c in the label l (and hence in the ciphertext $ct_2$), and of its opening o, to decryptor computer 4. Such a zero-knowledge proof reveals nothing to the decryptor computer other than the specific facts to be proved. The decryptor computer verifies this proof for ($ct_2$, l) in step 72. The remaining steps 73 to 77 correspond to steps 53 to 57 respectively of FIG. 5.

This embodiment provides a secure and highly-efficient implementation in which the decryptor computer is rendered oblivious in the decryption protocol. Since the commitment c is hidden in the label l, and the receiver computer proves possession of the hidden commitment in zero-knowledge, the decryptor computer cannot identify communications relating to individual users (message recipients) and cannot link different communications relating to the same user simply by participating in the decryption protocol. The system therefore offers full privacy to system users. Moreover, since the decryptor computer is oblivious, functionality of the decryptor computer can be conveniently combined with that of the KEA computer without loss of user privacy.

In general, steps of flow diagrams may be performed in a different order to that shown, and some steps may be performed concurrently, as appropriate. For example, while proving and verification steps of cryptographic proofs are described as sequential steps above, in general cryptographic proof protocols may be interactive or non-interactive protocols. In non-interactive protocols, a proof is generated and sent to the verifier which then verifies the received proof. In interactive protocols, the proving and verification procedure involves a sequence of steps of interaction between the prover and verifier. Interactive proof protocols are used in detailed implementations described below. Also, cryptographic proofs described above may in general comprise one or more component proofs which may be executed sequentially or concurrently.

The above embodiments can also be modified to allow the decryptor computer to check for revocation of recipients' public keys using publicly-available revocation information (RI) which indicates the revocation status (i.e. revoked/unrevoked) associated with particular public keys. Such revocation information can be provided in various ways, e.g. via publication of a black-list (or white-list) of revoked (or unrevoked) keys. Well-known cryptographic techniques, such as cryptographic accumulators, can also be used to allow the revocation information RI to indicate revocation status of keys without identifying the keys per se.

FIG. 8 indicates modifications to the decryption process of FIG. 7 in an embodiment accommodating revocation. In this embodiment, the commitment c comprises a commitment to both the user's secret s and a revocation handle rh which is associated with a public revocation status, indicated in public information RI, for the user's public key $pk_o$. By exploiting a vector commitment scheme (which allows commitment to a vector of messages), the revocation handle rh may be embedded in the user's commitment c at KEA computer 6 as detailed below. The revocation handle rh for public key $pk_o$ is stored by receiver computer 3 as part of the enhanced secret key. Following receipt of the encrypted message ($ct_1$, $ct_2$, l, w) in step 80 of FIG. 8, in step 81 the receiver computer 3 generates a revocation token from the stored revocation handle rh. This token rt permits verification of the revocation status associated with the revocation handle rh from the public revocation information RI. In step 82, the receiver computer sends ($ct_2$, l, rt) to the decryptor computer 4. As well as the zero-knowledge proof of knowledge of c and o, the proof provided by receiver computer 3 in this step includes a zero-knowledge proof which proves that the revocation token rt was generated from the revocation handle rh which is in the commitment c in $ct_2$. In step 83, decryptor computer 4 performs the proof verification procedure. This procedure includes using the supplied revocation token rt to verify from the revocation status (as indicated in RI) for handle rh in rt that the public key $pk_o$ is unrevoked. If all verification steps are successful (Y at decision block 84), then operation proceeds to steps 85 to 87 which correspond to steps 74 to 76 respectively of FIG. 7. If any verification step fails, e.g. if $pk_o$ is found to be revoked, then the decryptor computer aborts in step 88 and the decryption process terminates.

For successful decryption with the FIG. 8 procedure, receiver computer 3 must prove that the revocation token rt was generated from the revocation handle rh in the commitment c. Since this commitment is bound to $pk_o$, decryptor computer 4 knows that the token rt corresponds to the correct key $pk_o$. The message key k is returned to the receiver computer only if $pk_o$ is unrevoked. Decryption of messages for revoked keys is therefore prevented. However, the decryptor computer remains oblivious and cannot identify individual message recipients or link communications relating to the same recipient.

In embodiments, systems and methods are provided for communicating a message via a leakage-deterring encryption scheme. A system in an embodiment comprises a sender computer, a receiver computer and a decryptor computer each operable for communication via a network. The sender computer stores a public key $pk_o$ of a recipient key-pair ($pk_o$, $sk_o$) of a message recipient, a commitment c, bound to the public key $pk_o$, to a secret s of the message recipient, and a public key $pk_t$ of a decryptor key-pair ($pk_t$, $sk_t$). The receiver computer stores a secret key $sk_o$ of the recipient key-pair ($pk_o$, $sk_o$), the commitment c and an opening o to the commitment. The decryptor computer stores a secret key $sk_t$ of the decryptor key-pair ($pk_t$, $sk_t$). The sender computer is adapted to encrypt a message m for the message recipient by generating first and second ciphertexts. The first ciphertext encrypts the message m using a randomly-generated message key k and the public key $pk_o$ of the recipient key-pair. The second ciphertext encrypts an input, comprising the message key k and the commitment c, using a public key $pk_t$ of the decryptor key-pair ($pk_t$, $sk_t$). The sender computer sends the first and second ciphertexts to the receiver computer via the network. The receiver computer is adapted, in response to receipt of the first and second ciphertexts, to send the second ciphertext to the decryptor computer via the network and provide to the decryptor computer a proof proving knowledge of the commitment c in the second ciphertext and of the opening o to the commitment. The decryptor computer is adapted to verify the proof and, if the proof is verified, to send the message key k, obtained by decrypting the second ciphertext using the secret key $sk_t$ of the decryptor key-pair, to the receiver computer via the network. The receiver computer is further adapted, in response to receipt of the message key k, to decrypt the first ciphertext, using the message key k and the secret key sic, of the recipient key-pair, to obtain the message m.

Example implementations of the above embodiments are described in detail below. Some preliminaries are described first.

Preliminaries

Hereafter, algorithms are equivocally referred to as the functions they compute. Sets are assumed to be nonempty and finite. For a nonempty set S, $S^x$ stands for $\cup_{n\geq 1} S^n$, and $\overline{S}$, its complement (in a superset to be specified in case of ambiguity). To signify that a random variable X has a $\mathcal{D}$ distribution, the notation $X \leftarrow_s \mathcal{D}$ is used. When the distribution $\mathcal{D}$ is the uniform distribution over a finite set S, the notation $X \in_R S$ is used. The min-entropy $H_\infty(\mathcal{D})$ of a distribution $\mathcal{D}$ over a finite set S is defined as $-\max_{s \in supp(S)} \log_2 p_s$, with $p_s$ being the probability that a $\mathcal{D}$-distributed random variable takes the value s. The predictive probability ($\mathcal{D}$) of $\mathcal{D}$ is then defined as $2^{-H_\infty(\mathcal{D})}$, and corresponds to the maximum probability with which a $\mathcal{D}$-distributed random variable takes a specific value in S. A negligibility notion, i.e. a class of functions from $\mathbb{N}$ to [0, 1], is assumed to be fixed, as well as an efficiency class of algorithms $\mathcal{A}$. The probability of an event is said to be overwhelming if it can be written as $1-(\lambda)$ where ε is a negligible function of the security parameter λ. The security parameter is encoded in unary and given as an input to all algorithms Proofs of Knowledge Let L be a (decidable) language consisting of elements x for which there exists a witness w such that (x, w) belongs to some predetermined relation R. A proof of knowledge protocol (proof system) (P, V) for the language L, or the relation R, consists of a pair of interactive probabilistic algorithms customarily named prover and verifier respectively. The prover P attempts to convince the verifier V that it knows a witness to the membership of an element x (given to both the prover and the verifier) for the language L. Such a proof system is required to satisfy at least two properties: correctness and soundness. Correctness ensures that if (x, w)∈R, then P, on input w, should succeed in convincing V that x∈L with a probability P=1. The soundness property requires that for any possibly-malicious computationally-bounded prover P' that convinces V with non-negligible probability, there exists an efficient knowledge extractor, which interacts with P', that outputs with overwhelming probability a witness w such that (x, w)∈R. Additionally, (P, V) may be (perfectly or statistically) zero-knowledge, a property which guarantees that the verifier cannot obtain from the protocol any information except that P indeed knows such a witness w. A class of such zero-knowledge-proof systems is the class of Σ-protocols, which consist of three-move protocol rounds: a first move for the prover to commit to a certain randomness, a second for the verifier to choose a uniformly random challenge, and a third for the prover to answer the challenge.

Commitment Schemes

Consider a set S of secrets. A commitment scheme with message space S can be defined as a tuple of algorithms (ComSetup, ComKeygen, Com, ComVerf) where:

ComSetup: $\{1\}^x \rightarrow PARAM_c$ is a commitment-parameter generation algorithm;

ComKeygen: $PARAM_c \rightarrow CK$ is a commitment-key generation algorithm;

Com: $CK \times S \rightarrow C \times O$ is a probabilistic commitment algorithm that outputs a commitment to a secret in S and an opening;

ComVerf: $CK \times C \times O \rightarrow \{0, 1\}$ is a deterministic commitment-verification algorithm.

Note that commitment keys are here tacitly assumed to contain the parameters used to generate them. Given a key ck and a commitment c, an opening o is termed valid if ComVerf(ck, c, o)=1. The commitment schemes considered below satisfy the following security notions.

Correctness: a truthfully generated opening to a commitment should be accepted by the commitment-verification algorithm, i.e. $\forall \lambda \in \mathbb{N}_{\geq 1}, \forall s \in S$, ($\square$ComVerf(ck,c,o)=1:$param_c$=ComSetup($1^\lambda$), ck=ComKeygen($param_c$),(c,o)=Com(ck,s))$\square$=1.

Binding property: this property ensures that a commitment cannot be opened to two different values by any efficient algorithm A: $CK \rightarrow C \times O^2 \setminus \{(o, o'): o, o' \in O\}$, i.e. there exists a negligible function $\varepsilon: \mathbb{N} \rightarrow [0, 1]$ such that ($\square$ComVerf(ck,c,o)=1,ComVerf(ck,c,o')$\square$=1)$\square \leq \varepsilon(\lambda)$, for all $\lambda \in \mathbb{N}_{\geq 1}$, $param_c$=ComSetup($1^\lambda$), ck=ComKeygen($param_c$), (c, o, o')=A(ck).

Hiding property: no efficient algorithm can distinguish with non-negligible probability the distributions of the first components of Com(ck, s) and Com(ck, s'), for any ($param_c$, s, s')∈$PARAM_c \times S^2$, ck=ComKeygen($param_c$).

Instantiation

An example of such a commitment scheme is a generalization of the Pedersen commitment scheme (see "Non-interactive and information-theoretic secure verifiable secret sharing", Pedersen, CRYPTO'91, vol. 576 of LNCS, pp. 129-140). Such a scheme allows for a commitment to several messages at once in a length-reducing manner, as the resulting commitment is a single group element. It consists of a tuple $\mathcal{C}$=(ComSetup, ComKeygen, Com, ComVerf) where:

ComSetup($1^\lambda$)=param$_c$=(G,·) is an algorithm that outputs the description of a cyclic group (G,·) of prime order, in which the discrete-logarithm problem is assumed to be intractable;

ComKeygen(param$_c$)=ck is an algorithm that outputs a key ck=(G,·, e, $g_1$, ..., $g_n$) on input of the parameters, with ($g_1$, ..., $g_n$) a tuple of n>1 distinct non-neutral elements chosen uniformly at random;

Com(ck, $m_1$, ... $m_{n-1}$)=(c, o) is an algorithm that takes as an input a commitment key ck and messages $m_1$, ..., $m_{n-1}\in \mathbb{Z}_{|G|}$, generates $m_n$=r$\in_R$ {0, ..., |G|−1}, and outputs (c=$g_n^r \cdot \Pi_{i=1}^{n-1} g_i^{m_i}$, o=($m_1$, ..., $m_{n-1}$, r));

ComVerf(c, o)=b is an algorithm that returns the truth value of c=$g_n^r \cdot \Pi_{i=1}^{n-1} g_i^{m_i}$ for any key ck, commitment c∈G and opening o parsed as ($m_1$, ..., $m_{n-1}$, r).

CCA Encryption with Labels

The notion of label has proved useful in applications involving CCA security. A label is a public value attached to a ciphertext in a non-malleable fashion. Formally, an encryption scheme supporting labels (referred to herein as a "label encryption scheme") consists of a 4-tuple of algorithms (Setup, Keygen, Enc, Dec) that satisfies correctness (as well as other security properties mentioned below). That is, for all public parameters param$_e$ generated by the Setup algorithm, for all pairs of keys (pk, sk) generated by Keygen on input param$_e$, for any message m in the message space of the random map Enc and any label l in its label space, $$(\Box Dec(sk,Enc(pk,m,l),l)=m)\Box=1.$$

Such a scheme can be designed to be IND-CCA secure (secure under chosen-ciphertext attack) according to well-known principles.

Instantiation

Although the original Cramer-Shoup cryptosystem ("A practical public key cryptosystem provably secure against adaptive chosen ciphertext attack", Cramer & Shoup, CRYPTO'98, vol. 1462 of LNCS, pp. 13-25) does not specifically support labels, including a label in the hashed value does not alter the security proof of the scheme if the hash function is chosen uniformly at random from a family of collision-resistant hash functions. Accordingly, given a prime number $2^{\lambda-1} \leq p < 2^\lambda$:

Setup(1λ)=param is an algorithm that outputs the description of a group (G,·) of order p in which the decisional Diffie-Hellman problem is assumed to be intractable and of a family of collision-resistant hash functions;

Keygen(param)=(pk, sk) is an algorithm which, on input of the parameters, generates uniformly at random $g_1$, $g_2 \in G$, and $x_1$, $x_2$, $y_1$, $y_2$, $z \in \mathbb{Z}_p$, sets a=$g_1^{x_1}g_2^{x_2}$, b=$g_1^{y_1}g_2^{y_2}$, and $h_1=g_1^z$, chooses uniformly at random H from said family of collision-resistant hash functions, and sets the public key pk to (G,·, $g_1$, $g_2$, a, b, $\Box_1$, H) and the secret key sk to ($x_1$, $x_2$, $y_1$, $y_2$, z). It then outputs the pair (pk, sk);

Enc(pk, m)=et is an algorithm which, given a public key pk, a message m∈G and a label l, generates r$\in_R \mathbb{Z}_p$, computes $$u_1=g_1^r, u_2=g_2^r, e=h_1^r m, \alpha=H(u_1,u_2,e,l), v=a^r b^{r\alpha},$$

and outputs ct=($u_1$, $u_2$, e, v) as a ciphertext; and

Dec(sk, ct)=m is an algorithm which, to decrypt a ciphertext ct=($u_1$, $u_2$, e, v) together with a label l and a secret key sk as input, computes α=H ($u_1$, $u_2$, e, l) and checks whether v=$u_1^{x_1+y_1\alpha} u_2^{x_2+y_2\alpha}$. If so, it outputs e/$u_1^z$, otherwise it outputs Ø.

Definition of Leakage-Deterring Public Key Cryptosystems

In a three-party setting with an owner (i.e. owner of a recipient key pair, implemented by receiver computer 3 in the embodiments above), an authority (implemented by KEA computer 6 in the embodiments above) and a decryption third party (implemented by decryptor computer 4 in the embodiments above), each of which may make use of several algorithms, a leakage-deterring public-key cryptosystem, depending on a commitment scheme $\mathcal{C}$, consists of a tuple (Setup, OKeygen, TPKeygen, EnKey, Enc, Dec, Rec) where:

Setup: $\{1\}^x \to$ PARAM$_e \times$ PARAM$_c$ is a parameter-generation algorithm;

OKeygen: PARAM$_e \times$ PARAM$_c \to$ PK×SK×CK is an owner-key-generation algorithm;

TPKeygen: PARAM$_e \to$ PK×SK is a third-party key-generation algorithm;

EnKey: CK×C×O×($\Box$PK×SK)$\Box^2 \to$ EPK×ESK×EPK$^2$ is a key-enhancement interactive protocol between the owner's key-enhancement algorithm OkeyEn, the third party's TPKeyEn and the authority's AuthKeyEn that maps a tuple (ck, c, o, pk$_o$, sk$_o$, pk$_t$, sk$_t$) to ($\Box$OkeyEn(ck, c, o, pk$_t$, sk$_o$), TPKeyEn(ck, c, pk$_t$, sk$_t$), AuthKeyEn(ck, c, pk$_o$, pk$_t$))$\Box$ (note that, while EnKey in this generic construction allows for interaction with the decryption third party where this may be necessary, e.g. depending on the mechanism for binding commitments to public keys, involvement of the third party is not required in the example given below);

Enc: EPK×PK×M→CT is a probabilistic encryption algorithm;

Dec: ESK×SK×CT→M×{Ø} is an interactive decryption protocol involving the owner's decryption algorithm ODec and the third party's TPDec that maps (esk$_o$, sk$_t$, ct) to ($\Box$ODec(esk$_o$, ct), TPDec(sk$_t$))$\Box$ Rec: EPK×PK×B×D→S is a recovery algorithm that outputs an element s∈S, on input of an owner enhanced public key epk$_o$, a third-party public key pk$_t$, an algorithm B (which is a decryption algorithm ("decryption box") associated with an owner's key-pair) and a distribution D.

Furthermore, for λ∈N$_{\geq 1}$, consider the relations:

$$R_c=\{(c,o)\in C\times O: ComVerf(ck,c,o)=1\}$$

$$R_o=\{\Box(pk_o,sk_o)\in PK\times SK: ((pk_o,sk_o),ck)=OKeygen(param_e,param_c)\}\Box$$

$$R_t=\{\Box(pk_t,sk_t)\in PK\times SK: (pk_t,sk_t)=TPKeygen(param'_e)\}\Box$$

$$ER=\{\Box(epk_o,esk_o,pk_t,sk_t)\in EPK\times ESK\times R_t: \exists(c,o,pk_o,sk_o)\in R_c\times R_o, (epk_o,esk_o,epk_o,epk_o)=EnKey(ck,c,o,pk_o,sk_o,pk_t,sk_t)\}\Box$$

for any parameters param$_e$, param'$_e$ and param$_e$, and a commitment key ck computed as ComKeygen(param$_c$).

The following security definitions are satisfied by implementations below.

Correctness: The decryption of the encryption of a message should result in the message itself. That is, ∃(epk$_o$, esk$_o$, pk$_t$, sk$_t$)∈ER, ∃m∈M:

$$(\Box Dec(esk_o,sk_t,Enc(epk_o,pk_t,m))\Box=(m,\varnothing)\Box=1.$$

Privacy of the owner's data: The key-enhancement protocol should guarantee the privacy of the owner's secret, i.e., as long as the owner has not made publicly available an implementation capable of decrypting ciphertexts generated with her public key, no information about her secret should be leaked, not even to the authority during the key-enhancement protocol nor to the decryption third party during a decryption process for her own account.

Untraceability of the owner: The third party should not be able to infer from the execution of the decryption protocol any information about the owner whose public key was used to generate a ciphertext.

(Rewinding black-box) Recoverability of the owner's data: Should the owner build a decryption box accepting messages from a distribution $\mathcal{D}$ belonging to a specified class D, anyone with rewinding black-box access to it should be able to derive the owner's secret calling on the recovery algorithm Rec. In this respect, consider the following interaction between any efficient adversary A and a challenger C on input of a security parameter $1^\lambda$.
1. C generates system parameters, computes a commitment key ck by running ComKeygen($param_c$), as well as a third-party pair of keys ($pk_t$, $sk_t$); (the owner-encryption-scheme parameters,) ck and $pk_t$ are sent to A;
2. A sends a secret s and a public key $pk_o$ to C. Challenger C computes (c, o)=Com(ck, s), and sends the pair to A;
3. A and C execute the key-enhancement protocol, with C running algorithm AuthKeyEn(ck, c, $pk_o$, $pk_t$), and obtaining an enhanced public key $epk_o$;
4. A implements an algorithm B and sends the implementation to C, together with the description of a distribution $\mathcal{D}$; and
5. C runs Rec on input $epk_o$, $pk_t$, B and the description of $\mathcal{D}$, and gets an output s'.

B is said to be $\delta$-correct with respect to $\mathcal{D}$ if for m←$\mathcal{D}$, ((B(Enc($epk_o$, $pk_t$, m)), TPDec($sk_t$))=(m, Ø)□≥$\delta$. Given a non-negligible 0≤$\delta$≤1, a cryptosystem satisfies rewinding black-box recoverability of the owner's data with respect to a class D if there exists a negligible function $\varepsilon$: $\mathbb{N}$ →[0, 1] such that for all $\lambda \in \mathbb{N}_{\geq 1}$, P(B is $\delta$-correct with respect to $\mathcal{D}$, $\mathcal{D} \in D$, s≠s')□≤$\varepsilon(\lambda)$. The classes D of interest, are those contained in the maximal class for which one may expect to successfully deter owners from delegating their decryption capabilities, i.e. those of distributions $\mathcal{D}$ such that $\delta$−p($\mathcal{D}$) is non-negligible.

LD-IND-CPA security: A security definition akin to the classical indistinguishability under chosen-plaintext attack, which takes the enhancement of the keys into account.

LD-IND-CCA security: A security definition analogous to the classical indistinguishability under chosen-ciphertext attack.

Construction of a Leakage-Deterring Public Key Cryptosystem

The following gives a generic construction of an LDE scheme for the embodiment of FIGS. 6 and 7 above. Let $\mathcal{C}$ be a commitment scheme as previously defined. Consider an IND-CPA secure encryption scheme $\varepsilon$ with message space $M \subseteq \{0, 1\}^x$, and an IND-CCA secure encryption scheme $\tilde{\varepsilon}$ supporting labels with message space M and label space L. Let F: $C \times \Omega \mapsto L$ be a collision-resistant function such that F(c, $\omega$) has a uniform distribution over L for all c∈$\mathcal{C}$ if $\omega \in_R \Omega$. Assume that a zero-knowledge proof-of-knowledge system (ComPf, ComProofVf) for the relation $Rc=\{(c,o) \in C \times O: ComVerf(ck,c,o)=1\}$ exists for predetermined parameters $param_c$ and a commitment key ck computed as ComKeygen($param_c$).

Now, consider a cryptosystem $\varepsilon'$ in which:
$\varepsilon'$.Setup($1^\lambda$)=(($param_e$, $param'_e$), $param_c$) is an algorithm that generates $param_e$=$\varepsilon$.Setup($1^\lambda$), $param'_e$=$\tilde{\varepsilon}$.Setup($1^\lambda$) and $param_c$=ComSetup($1^\lambda$), and outputs them, after generating and appending parameters of function F to those of $\varepsilon$;

$\varepsilon'$.OKeygen($param_e$, $param_c$)=(($pk_o$, $sk_o$), ck) is an algorithm that generates a commitment key ck=ComKeygen($param_c$), as well as an owner pair of keys ($pk_o$, $sk_o$)=$\varepsilon'$.Keygen($param'_e$);

$\varepsilon'$.TPKeygen($param'_e$)=($pk_t$, $sk_t$) is an algorithm that generates a third-party pair of keys ($pk_t$, $sk_t$)=$\varepsilon'$.Keygen($param'_e$);

$\varepsilon'$.EnKey(ck, c, o, $pk_o$, $sk_o$, $pk_t$, $sk_t$)=(OkeyEn(ck, c, o, $pk_o$, $sk_o$), TPKeyEn(ck, c, $pk_t$, $sk_t$), AuthKeyEn(ck, c, $pk_o$, $pk_t$)) is a key-enhancement protocol in which the parties' algorithms proceed as follows:
1. the owner's key-enhancement algorithm OkeyEn, sends c (and $pk_o$) to the authority's AuthKeyEn and runs protocol (ComPf(c, o), ComProofVf(c)) with it;
2. if the protocol fails, the overall key-enhancement protocol is aborted, i.e. $epk_o$=$esk_o$=Ø. Otherwise, the algorithms set $epk_o$=($pk_o$, c), and the owner's key enhancement algorithm additionally sets $esk_o$=($sk_o$, c, o);

$\varepsilon'$.Enc($epk_o$, $pk_t$,m)=ct is an encryption algorithm that takes as an input $epk_o$=($pk_o$, c), $pk_t$ and m∈M, generates $m_2 \in_R \{0, 1\}^{|m|}$, $\omega \in_R \Omega$, sets $m_1$=m$\oplus m_2$, computes l=F(c, $\omega$), and outputs a ciphertext ct computed as ($ct_1$=$\varepsilon$.Enc($pk_o$,$m_1$), $ct_2$=$\tilde{\varepsilon}$.Enc($pk_t$,$m_2$, l), l, $\omega$)□, (whereby $m_2$ is the message key k in the embodiments above, and $m_1$ is the encrypted message m');

$\varepsilon'$.Dec(ck, $esk_o$, $sk_t$, ct)=(ODec(ck, $esk_o$, ct), TPDec(ck, $sk_t$))=(m, Ø) is the subsequent protocol (note that ck is assumed to be also given to TPDec and ODec):
1. algorithm ODec sends ($ct_2$, l) to TPDec;
2. suppose that a zero-knowledge proof system (P, V) for the relation {□(□(ck,l),(c,o,$\omega$))□∈CK×L×C×O×Ω: ComVerf(ck, c,o)=1, l=F(c,$\omega$)}□ is given. Algorithms ODec and TPDec conjointly run the zero-knowledge protocol (P(c, o, $\omega$),V(ck, l)) with respective roles P and V;
3. If the protocol fails, ODec outputs Ø. If the protocol succeeds, then TPDec sends $m_2$=$\tilde{\varepsilon}$.Dec($sk_t$, $ct_2$, l) to ODec, which in turn outputs $\varepsilon$.Dec($sk_o$, $ct_1$)$\oplus m_2$ if $m_2 \neq$Ø, Ø otherwise; and $\varepsilon'$.Rec($epk_o$, $pk_t$, B, $\mathcal{D}$)=s is a recovery algorithm which, on input of keys $epk_o$=($pk_o$, c), $pk_t$, of a decryption algorithm B and of a distribution $\mathcal{D}$, repeatedly generates a message m with distribution $\mathcal{D}$, computes a ciphertext $\varepsilon'$.Enc($epk_o$, $pk_t$, m)=($ct_1$, $ct_2$, l, $\omega$), and gives it to B as an input, until the latter outputs the pair ($ct_2$, l) and succeeds in protocol (P, V), with B playing the role of P and Rec playing the role of V. Once this event occurs, algorithm Rec runs the knowledge extractor of the proof system (P, V), which can rewind B, to extract a witness that contains a secret s, a commitment of which is c.

It can be proved that:
$\varepsilon'$ is correct if $\varepsilon$, $\tilde{\varepsilon}$ and (P, V) are;
$\varepsilon'$ satisfies privacy of the owner's data if $\mathcal{C}$ is hiding and protocols (ComPf, ComProofVf) and (P, V) are zero-knowledge proof of knowledge systems;
$\varepsilon'$ satisfies untraceability of the owner if (P, V) is zero-knowledge and F(c, $\omega$) has a uniform distribution for any commitment c as soon as $\omega$ does;
$\varepsilon'$ satisfies recoverability of the owner's data with respect to the class of distributions $\mathcal{D}$ such that $\delta$−2p($\mathcal{D}$) is non-negligible, assuming $\mathcal{C}$ to be binding and $\varepsilon'$ to be IND-CCA secure;
$\varepsilon'$ is LD-IND-CPA secure if $\varepsilon$ is IND-CPA secure; and
$\varepsilon'$ is LD-IND-CCA secure if $\varepsilon$ is IND-CCA secure.

The above provides a simple and highly efficient construction with constant-size ciphertexts.

An Instantiation

The following gives a more detailed example of the above system. Let $\varepsilon$ be the ElGamal encryption scheme ("A public key cryptosystem and a signature scheme based on discrete logarithms", ElGamal, CRYPTO'84, vol. 196 of LNCS, pp. 10-18), $\mathbb{Z}$ a classical Pedersen commitment scheme (where the space of secrets S here is $\mathbb{Z}_p$), and $\tilde{\varepsilon}$ is the variant of the Cramer-Shoup cryptosystem defined above. The three schemes are assumed to be given, within their parameters, a description of the same group (G,·). Set protocol (ComPf, ComProofVf) to be a zero-knowledge protocol as described in the preliminaries above. For pairwise distinct g, h, $\tilde{h} \in G$, since proving knowledge of (c, (s, r), $\omega$) such that $c=g^s h^r$ and $1=\tilde{ch}^\omega$ is equivalent (by setting $c=1/\tilde{h}^\omega$) to proving knowledge of (s, r, $\omega$) such that $1=g^s h^r \tilde{h}^\omega$, proof protocol (P, V) can be chosen accordingly. Relating to the generic construction above, function F is equal to (c, $\omega$) $\mapsto \tilde{ch}^\omega$, and its collision resistance is immediately inferred from the binding property of the generalized Pedersen commitment scheme.

Consider then a cryptosystem $\varepsilon'$ such that:

$\varepsilon'$.Setup($1^\lambda$)=((param$_e$, param'$_e$), param$_c$)) is an algorithm that outputs the description of a group (G, ·) of prime order p in which the discrete-logarithm problem (and thus the decisional-Diffie-Hellman problem as well) is assumed to be intractable as part of the parameters of both the encryption schemes and the commitment scheme. (This supposes that for each prime number p, and therefore each security parameter $\lambda$, there is only one group such that its description is output by the parameter generation algorithms of the commitment scheme and both the encryption schemes, with overwhelming probability). In addition, a group element $\tilde{h} \in_R G$ is appended to the owner-encryption-scheme parameters, and the third-party encryption parameters include the description of a family of collision-resistant hash functions;

$\varepsilon'$.OKeygen(param$_e$, param$_c$)=((pk$_o$, sk$_o$), ck) is an algorithm that takes the description of a group (G, ·) and $\tilde{h} \in G$, generates g, $\square$, $g_3 \in_R G$ and $x \in_R \mathbb{Z}_p$, and outputs pk$_o$=(G, ·, p, $g_3$, $X=g_3^x$, $\tilde{h}$) as a public encryption key, sk$_o$,=x as a secret key and ck=(g, $\square$) as a commitment key;

$\varepsilon'$.TPKeygen(param'$_e$)=(pk$_t$, sk$_t$) is an algorithm that takes as an input the description of a group (G, ·) and of a family of collision-resistant hash functions, generates $g_1, g_2 \in_R G$, $x_1$, $x_2$, $y_1$, $y_2$, $z \in_R \mathbb{Z}_p$, sets $a=g_1^{x_1}g_2^{x_2}$, $b=g_1^{y_1}g_2^{y_2}$, $h_1=g_1^z$, chooses H uniformly at random from said family of hash functions, and outputs pk$_t$=(G, ·, $g_1$, $g_2$, a, b, $\square_1$, H) as a public key and sk$_t$=($x_1$, $x_2$, $y_1$, $y_2$) as a secret key;

$\varepsilon'$.EnKey(ck, c, o, pk$_o$, sk$_o$, pk$_t$, sk$_t$)=is a key-enhancement protocol in which, to enhance a pair of public-secret keys ((G, ·, p, $g_3$, X, $\tilde{h}$), x), the owner's algorithm (on input of a commitment c and of an opening o=(s, r)) and the authority's algorithm run protocol (ComPf, ComProofVf) k times with k large enough for $1/|C|^k$ to be negligible (to reach negligible soundness error). If the k iteration of the protocol succeeds, the owner's enhanced public key is set to epk$_o$=(G, ·, p, g, X, $\tilde{h}$, c), and her enhanced secret key to esk$_o$=(x, c, (s, r)), otherwise both enhanced keys are set to Ø;

$\varepsilon'$.Enc(epk$_o$, pk$_t$, m)=ct is an algorithm which, to encrypt a message $m \in G$ with keys epk$_o$(G, ·, p, $g_3$, X, $\tilde{h}$, c) and pk$_t$=(G, ·, $g_1$, $g_2$, a, b, $\square_1$, H), generates $m_2 \in_R G$ and $\omega \in_R \mathbb{Z}_p$, computes $l=\tilde{ch}^\omega$, and sets the ciphertext to $$ct=(\varepsilon.Enc(X,m\cdot m_2), \tilde{\varepsilon}.Enc(pk_t,m_2,l),l,\omega),$$

which is equal to $$\left((\square g_3^{r_1}, X^{r_1} m \cdot m_2), \left(g_1^{r_2}, g_2^{r_2}, h_1^{r_2} m_2, a^{r_2} b^{r_2 H(g_1^{r_2}, g_2^{r_2}, h_1^{r_2} m_2, \tilde{ch}^\omega)}\right), \tilde{ch}^\omega, \omega\right)$$

for $r_1$ and $r_2$ chosen uniformly at random from $\mathbb{Z}_p$;

$\varepsilon'$.Dec(esk$_o$, sk$_t$, ct)=m is a protocol in which the owner's decryption algorithm ODec on input of a ciphertext ct=(($w_1$ $w_2$), ($u_1$, $u_2$, e, v), l, $\omega$) and a secret key sk$_o$=x, and the third party's on input sk$_t$=($x_1$, $x_2$, $y_1$, $y_2$, z) proceed as follows:

1. ODec sends (($u_1$, $u_2$, e, v), l) to TPDec;
2. ODec and TPDec conjointly run protocol (P, V) with respective roles P and V;
3. If the protocol fails, TPDec sends Ø to ODec, otherwise it computes $\alpha=($u_1$, $u_2$, e, l)$ and checks whether $v=u_1^{x_1+y_1\alpha}u_2^{x_2+y_2\alpha}$. If not, it sends back Ø, otherwise it sends $m_2=e/u_1^z$ to ODec, which in turn outputs $w_2/(w_1^x m_2)$. Whenever ODec receives Ø from TPDec, it outputs Ø; and $\varepsilon'$.Rec(epk$_o$, pk$_t$, B, $\mathcal{D}$)=s a recovery algorithm which, on input of keys epk$_o$=(pk$_o$, c) and pk$_t$, of a decryption algorithm B and of a distribution $\mathcal{D}$, repeatedly generates a message m with distribution $\mathcal{D}$, computes a ciphertext $\varepsilon'$.Enc(epk$_o$, pk$_t$,m)=(ct$_1$, ct$_2$, l, $\omega$), and gives it to B as an input, until the latter outputs the pair (ct$_2$, l) and succeeds in protocol (P, V), with B playing the role of P and Rec playing the role of V. Once this event occurs, algorithm Rec runs the knowledge extractor of proof system (P, V), which can rewind B, to extract a witness that contains a secret s, a commitment of which is c.

The above instantiation satisfies correctness, privacy of the owner's data, untraceability of the owner, recoverability of the owner's data and leakage-deterring IND-CPA security. Replacing the ElGamal scheme with an IND-CCA-secure one which has a subset of G as message space would imply LD-IND-CCA security for the scheme.

Enabling Revocation

The following gives a detailed implementation of the revocation-enabled scheme described with reference to FIG. 8. The proof that the key pk$_o$ is unrevoked is done in a privacy-preserving fashion, i.e., without destroying untraceability of the owner. A generic revocation component described in "Formal treatment of privacy-enhancing credential systems", Camenisch et al., SAC, pp. 3-24, 2015, can be added to the system to enable privacy-preserving revocation. We refer to this component as the anonymous revocation component (ARC). An ARC requires an additional entity called a revocation authority (RA). The role of the RA in our scenario can be played by the authority (KEA computer) itself, by the oblivious third party (decryptor computer) assisting with decryption or by any other party in the system. The RA assists the authority that participates with the key enhancement protocol, maintains the necessary revocation information, and changes the revocation status of the public keys. The Camenisch et al. reference describes the necessary interfaces and definitions for an ARC, and shows how to instantiate it with a revocation scheme described in "Revocable group signature schemes with constant costs for signing and verifying", Nakanishi et al. PKC 2009, vol. 5443 of LNCS, pp. 463-480. "Accumulators with applications to anonymity-preserving revocation", Baldimtsi et al., EuroS&P 2017 describes how to instantiate ARC with accumulators. Either of these instantiations can be used here.

The ARC algorithms described by Camenisch et al. are recalled below.

Revocation component ARC by Camenisch et al.

In ARC, revocation is done via a special value called a revocation handle (rh) that can be embedded into the revocable object, here an enhanced public key. ARC consists of the following algorithms ARC.SPGen, ARC.RKGen, ARC.Revoke, ARC.RevTokenGen, and ARC.RevTokenVer. Revocation parameters are generated using ARC.SPGen ($spar_g$)=$param_r$, and then added to the global system parameters $spar_s$. The revocation authority RA runs ARC.RKGen ($param_r$)=(rsk, rpk, RI) to generate the RA's secret and public keys (rsk, rpk) and the initial revocation information RI. RI contains all public data that parties need to generate and verify proofs of non-revocation. RI can also be supplemented by privately held witnesses. The RA can revoke revocation handle rh by updating the revocation information RI: ARC.Revoke(rh, rsk, RI)=RI'. An unrevoked party can generate a publicly verifiable token rt proving that the revocation handle rh is unrevoked and that c is a commitment to rh. ARC.RevTokenGen(rh, c, o, RI, rpk)=rt. For each new revocation token rt, a fresh commitment to rh is used to avoid making tokens linkable. A verifier can check such a token by running ARC.RevTokenVer(rt, c, RI, rpk)={0, 1}.

Adding ARC to the Leakage-Deterring Cryptosystem

The LDE scheme can be extended with the ARC algorithms as follows. We denote ε' with ARC as ε'Rev. A revocation handle is embedded by the authority into an enhanced public key together with the owner's data s. If a key is revoked, the corresponding revocation handle is added to the publicly available revocation information. rh is contained in the enhanced public key (in the commitment together with s), so it is included in ciphertext $ct_2$ inside the label during encryption. During decryption, the owner proves that the revocation handle, embedded in the ciphertext through the label, is unrevoked by committing to rh, creating a fresh unlinkable revocation token that proves rh is unrevoked with respect to RI, and also proving that rh from the revocation token is the same one embedded in the ciphertext (via the commitment to rh). If the token is valid and the proof succeeds, the oblivious third party assists with decryption.

The modifications to the ε' algorithms and protocols are given below. We also add a revocation algorithm that is run by RA to revoke a public key by revoking the corresponding revocation handle and updating the revocation information.

$εE'_{Rev}$.Setup($1^λ$) is extended to generate revocation parameters ARC.SPGen($1^λ$)=$param_r$, and the keys of the revocation authority: ARC.RKGen($param_r$)=(rsk, rpk, RI).

$ε'_{Rev}$.OKeygen($param_e$, $param_c$) is the same as $ε'_{Rev}$.OKeygen except the commitment key will be extended to accommodate rh in a commitment.

$ε'_{Rev}$.TPKeygen($param'_e$) is the same as for ε'.

$ε'_{Rev}$.EnKey(ck, c, o, $pk_o$, $sk_o$, $pk_t$, $sk_t$, rh)=(OkeyEn(ck, c, o, $pk_o$, $sk_o$), TPKeyEn(ck, c, $pk_t$, $sk_t$), AuthKeyEn(ck, c, $pk_o$, $pk_t$, rh))=is a key-enhancement protocol in which the parties' algorithms proceed as follows:

1. The owner-key-enhancement algorithm OkeyEn, on input of a commitment c and an opening o (in addition to ck, $pk_o$ and $sk_o$), sends c (and $pk_o$) to the authority's AuthKeyEn and runs protocol (ComPf(c, o), ComProofVf(c)) with it;
2. If the protocol fails, the overall key-enhancement protocol is aborted, i.e. $epk_o$=$esk_o$=∅. Otherwise, the authority picks a rh and, using the homomorphic property of commitment scheme $\mathcal{C}$, updates c to be a commitment to rh as well as to s, and sends (c, rh) back to the owner. The algorithms set $epk_o$=($pk_o$, c), and the owner's key enhancement algorithm additionally sets $esk_o$=($sk_o$, c, o), where o=(s, rh, r).

$ε'_{Rev}$.Revoke(rh, rsk, RI)=RI' is a revocation algorithm run by RA. It revokes revocation handle rh by updating revocation information by invoking ARC.Revoke(rh, rsk, RI)=RI' and publishing the updated revocation information.

$ε'_{Rev}$.Enc($epk_o$, $pk_t$, m)=ct is the same as for ε'.

$ε'_{Rev}$.Dec(ck, $esk_o$, $sk_t$, ct, RI, rpk)=(ODec(ck, $esk_o$, ct, RI, rpk), TPDec(ck, $sk_t$, RI, rpk))=(m, ∅) is the subsequent decryption protocol
1. Algorithm ODec runs ($c_{rh}$, $o_{rh}$)=Com(rh), where $o_{rh}$=(rh, r'); computes rt=ARC.RevTokenGen(rh, $c_{rh}$, $o_{rh}$, RI, rpk) and sends (rt, $c_{rh}$, $ct_2$, l) to TPDec;
2. Suppose that a zero-knowledge proof system (P, V) is given for the relation $$\{□(□(ck,c_{rh},l),(c,(s,rh,r),(rh,r'),ω))□∈CK×L×C×O×Ω:ComVerf(ck,c,(s,rh,r))=1∧ComVerf(ck,c_{rh},(rh,r'))=1∧l=F(c,ω)\}$$

The algorithms ODec and TPDec conjointly run the zero-knowledge protocol (P(c, (s, rh, r), (rh, r'), ω),V(ck, $c_{rh}$,l)) with respective roles P and V;
3. If the protocol fails, ODec outputs ∅. Otherwise, TPDec runs ARC.RevTokenVer(rt, $c_{rh}$, RI, rpk). If verification is successful then TPDec sends $m_2$=ε̃.Dec($sk_t$, $ct_2$, l) to ODec, which in turn outputs ε.Dec($sk_o$, $ct_1$)⊕$m_2$ if $m_2$≠∅, and ∅ otherwise.

$ε'_{Rev}$.Rec($epk_o$, $pk_t$,B, $\mathcal{D}$ )=(s, rh) is the same algorithm as for ε', except rh is also recovered as another witness together with s.

The above scheme thus provides the revocation functionality without affecting the recoverability of the owner's private data or the CPA/CCA security properties of $ε'_{Rev}$.

It will be seen that embodiments described above provide secure and efficient privacy-preserving LDE systems. However, many changes and modifications can of course be made to the exemplary embodiments described. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of communicating a message, the system comprising a sender computer, a receiver computer and a decryptor computer each operable for communication via a network, wherein:
   the sender computer stores a public key $pk_o$ of a recipient key-pair ($pk_o$, $sk_o$) of a message recipient, a commitment c, bound to the public key $pk_o$, to a secret s of the message recipient, and a public key $pk_t$ of a decryptor key-pair ($pk_t$, $sk_t$);
   the receiver computer stores a secret key $sk_o$ of said recipient key-pair ($pk_o$, $sk_o$), said commitment c and an opening o to said commitment;
   the decryptor computer stores a secret key $sk_t$ of said decryptor key-pair ($pk_t$, $sk_t$);
   the sender computer is adapted to encrypt a message m for said message recipient by generating first and second ciphertexts, wherein the first ciphertext encrypts the message m using a randomly-generated message key k and said public key $pk_o$ of the recipient key-pair and the second ciphertext encrypts an input, comprising said message key k and said commitment c, using a public key $pk_t$ of said decryptor key-pair ($pk_t$, $sk_t$), and to send the first and second ciphertexts to the receiver computer via the network;

the receiver computer is adapted, in response to receipt of said first and second ciphertexts, to send the second ciphertext to the decryptor computer via the network and provide to the decryptor computer a proof proving knowledge of said commitment c in the second ciphertext and of said opening o to the commitment;

the decryptor computer is adapted to verify said proof and, responsive to the proof being verified to send the message key k, obtained by decrypting the second ciphertext using the secret key $sk_t$ of said decryptor key-pair, to the receiver computer via the network; and the receiver computer is further adapted, in response to receipt of the message key k, to decrypt the first ciphertext, using the message key k and the secret key $sk_o$ of the recipient key-pair, to obtain said message m.

2. The system as claimed in claim 1 wherein said proof comprises a zero-knowledge proof of knowledge of said commitment c and opening o.

3. The system as claimed in claim 1 wherein the sender computer is adapted to re-randomize the commitment c to produce a re-randomized commitment value, and to generate the second ciphertext from an input comprising said message key k and said re-randomized commitment value.

4. The system as claimed in claim 3 wherein:
the sender computer is adapted to produce the re-randomized commitment value using a randomly-generated value w, to generate the second ciphertext via a label encryption scheme whereby said input comprises the message key k and a label comprising said re-randomized commitment value, and to send the label and said randomly-generated value w to the receiver computer with the first and second ciphertexts; and
the receiver computer is adapted to send the label to the decryptor computer with the second ciphertext.

5. The system as claimed in claim 1 wherein the sender computer is adapted:
to generate the message key k as a one-time pad key;
perform one-time pad encryption of the message m, using the message key k, to produce an encrypted message m'; and
to encrypt the encrypted message m' using said public key $pk_o$ of the recipient key-pair to generate the first ciphertext.

6. The system as claimed in claim 3 wherein: said commitment c comprises a commitment to both said secret s and a revocation handle rh which is associated with a public revocation status for the public key $ph_o$ of said recipient key-pair; the receiver computer stores said revocation handle rh; the receiver computer is further adapted to generate from the revocation handle rh a revocation token rt, permitting verification of said revocation status associated with the revocation handle rh, and to send the revocation token rt to the decryptor computer with the second ciphertext, wherein said proof provided by the receiver computer further proves that the revocation token rt was generated from the revocation handle rh in the commitment c in the second ciphertext; and the decryptor computer is adapted, in verifying said proof, to verify from said revocation status that the public key pk, is unrevoked.

7. The system as claimed in claim 1 wherein:
the sender computer is adapted to generate the first ciphertext by generating the message key k as a one-time pad key, performing one-time pad encryption of the message m using the message key k to produce an encrypted message f, and encrypting the encrypted message m' using said public key $pk_o$ of the recipient key-pair;
the sender computer is further adapted to generate the second ciphertext via a label encryption scheme whereby said input comprises the message key k and a label produced by re-randomizing said commitment c using a randomly-generated value w, and to send the label and said randomly-generated value w to the receiver computer with the first and second ciphertexts;
the receiver computer is adapted to send the label to the decryptor computer with the second ciphertext; and
said proof provided by the receiver computer comprises a zero-knowledge proof of knowledge of said commitment c and opening o.

8. The system as claimed in claim 7 wherein: said commitment c comprises a commitment to both said secret s and a revocation handle rh which is associated with a public revocation status for the public key $pk_o$ of said recipient key-pair; the receiver computer stores said revocation handle rh; the receiver computer is further adapted to generate from the revocation handle rh a revocation token rt, permitting verification of said revocation status associated with the revocation handle rh, and to send the revocation token rt to the decryptor computer with the second ciphertext, wherein said proof provided by the receiver computer further proves that the revocation token rt was generated from the revocation handle rh in the commitment c in the second ciphertext; and the decryptor computer is adapted, in verifying said proof, to verify from said revocation status that the public key $pk_o$ is unrevoked.

9. A computer-implemented method for sending a message, the method comprising, at a sender computer operable for communication with a receiver computer via a network:
storing a public key $pk_o$ of a recipient key-pair ($pk_o$, $sk_o$) of a message recipient, a commitment c, bound to the public key $pk_o$, to a secrets of the message recipient, and a public key $pk_t$ of a decryptor key-pair ($pk_t$, $sk_t$);
encrypting a message m for said message recipient by generating first and second ciphertexts, wherein the first ciphertext encrypts the message m using a randomly-generated message key k and said public key $pk_o$ of the recipient key-pair, and the second ciphertext encrypts an input, comprising said message key k and said commitment c, using a public key $pk_t$ of said decryptor key-pair ($pk_t$, $sk_t$); and
sending the first and second ciphertexts to the receiver computer via the network, wherein a verification of proof of knowledge of the commitment c is required to be provided to decrypt the message key k from the second ciphertext using the secret key $sk_t$ of the decryptor key-pair, the message key k for use with the secret key $sk_o$ of the recipient key-pair for decrypting the first ciphertext to obtain the message m.

10. The method as claimed in claim 9 comprising, at the sender computer, re-randomizing the commitment c to produce a re-randomized commitment value and generating the second ciphertext from an input comprising said message key k and said re-randomized commitment value.

11. The method as claimed in claim 9 comprising, at the sender computer, generating the second ciphertext via a label encryption scheme whereby said input comprises the message key k and a label produced by re-randomizing said commitment c using a randomly-generated value w, and sending the label and said randomly-generated value w to the receiver computer with the first and second ciphertexts.

12. The method as claimed in claim 9 comprising, at the sender computer:
generating the message key k as a one-time pad key;
performing one-time pad encryption of the message m, using the message key k, to produce an encrypted message m'; and
encrypting the encrypted message m' using said public key $pk_o$ of the recipient key-pair to generate the first ciphertext.

13. The method as claimed in claim 9 comprising, at the sender computer:
generating the first ciphertext by generating the message key k as a one-time pad key, performing one-time pad encryption of the message m using the message key k to produce an encrypted message m', and encrypting the encrypted message using said public key $pk_o$ of the recipient key-pair;
generating the second ciphertext via a label encryption scheme whereby said input comprises the message key k and a label produced by re-randomizing said commitment c using a randomly-generated value w; and
sending the label and said randomly-generated value w to the receiver computer with the first and second ciphertexts.

14. A computer-implemented decryption method for decrypting a message m sent from a sender computer to a receiver computer, the decryption method comprising, at the receiver computer:
storing a secret key $sk_o$ of a recipient key-pair ($pk_o$, $sk_o$), a commitment c and an opening o to said commitment;
in response to receipt of a first and second ciphertexts, sending the second ciphertext via the network to a decryptor computer storing a secret key $sk_t$ of a decryptor key-pair ($pk_t$, $sk_t$), and providing to the decryptor computer a proof proving knowledge of said commitment c in the second ciphertext and of said opening o to the commitment;
in response to verification of said proof at the decryptor computer, receiving from the decryptor computer a message key k obtained by decrypting the second ciphertext at the decryptor computer using the secret key $sk_t$ of said decryptor key-pair; and
decrypting the first ciphertext, using the message key k and the secret key $sk_o$ of the recipient key-pair, to obtain said message m.

15. The method as claimed in claim 14 wherein said proof comprises a zero-knowledge proof of knowledge of said commitment c and opening o.

16. The method as claimed in claim 15 wherein said commitment c comprises a commitment to both a secret s of the message recipient and a revocation handle rh which is associated with a public revocation status for a public key $pk_o$ of said recipient key-pair, the method comprising, at the receiver computer:
storing said revocation handle rh;
generating from the revocation handle rh a revocation token rt, permitting verification of said revocation status associated with the revocation handle rh;
sending the revocation token rt to the decryptor computer with the second ciphertext, wherein said proof provided by the receiver computer further proves that the revocation token rt was generated from the revocation handle rh in the commitment c in the second ciphertext.

* * * * *